No. 847,676. PATENTED MAR. 19, 1907.
A. A. MacKETHAN.
WOOD DISTILLING APPARATUS.
APPLICATION FILED DEC. 22, 1905.
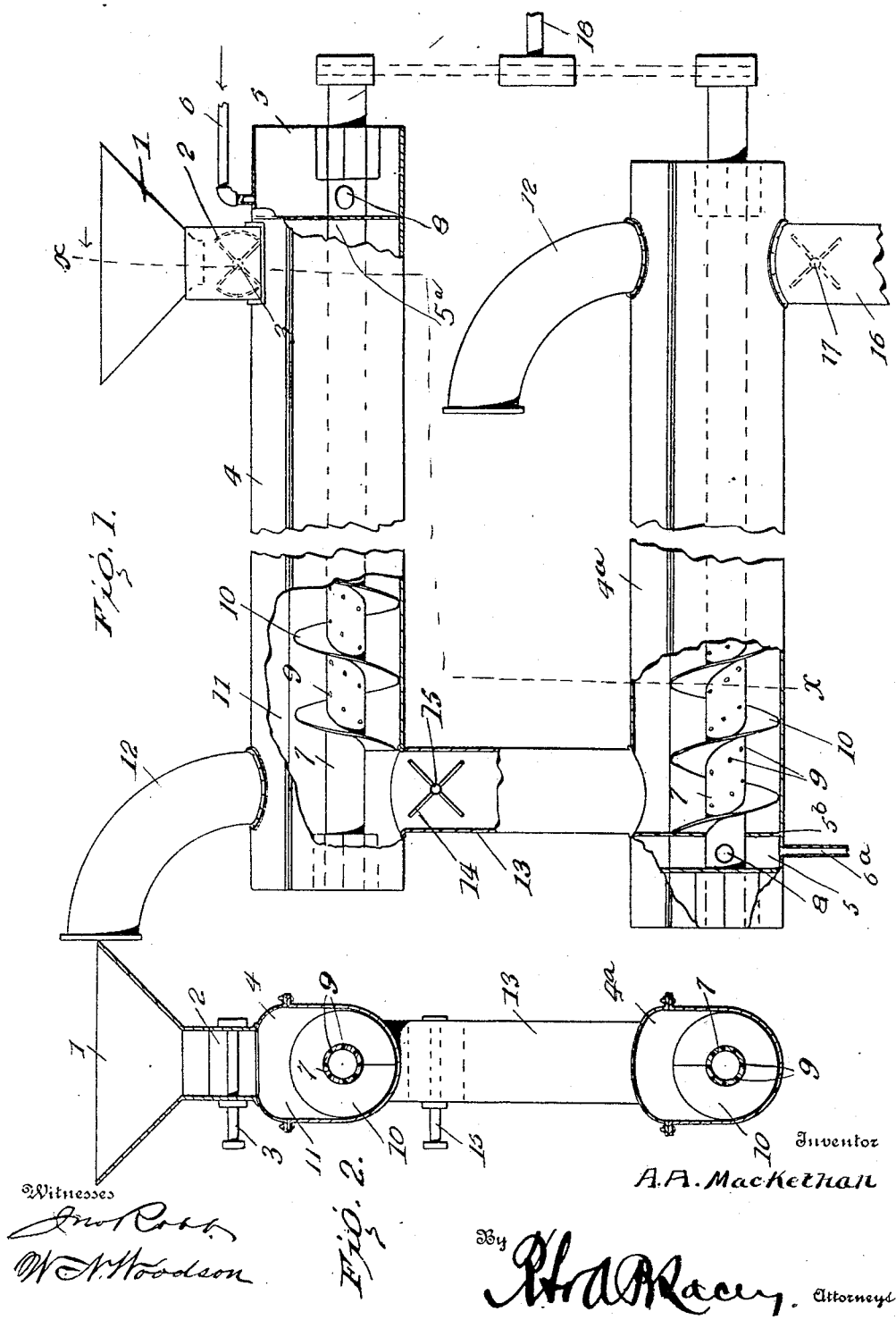
Witnesses
Inventor
A. A. MacKethan
By ..., Attorneys

UNITED STATES PATENT OFFICE.

ALFRED A. MacKETHAN, OF FAYETTEVILLE, NORTH CAROLINA.

WOOD-DISTILLING APPARATUS.

No. 847,676.          Specification of Letters Patent.          Patented March 19, 1907.

Application filed December 22, 1905. Serial No. 292,992.

*To all whom it may concern:*

Be it known that I, ALFRED A. MAC-KETHAN, a citizen of the United States, residing at Fayetteville, in the county of Cumberland and State of North Carolina, have invented certain new and useful Improvements in Wood-Distilling Apparatus, of which the following is a specification.

The object of my invention is to provide an improved apparatus for use in extracting oils and other products from sawdust and other wood-pulp by passing the sawdust continuously through conveyers arranged in series, the sawdust or the like being distilled by means of steam entered in hollow shafts each of which carries a conveying spiral or blades and passing out of said shaft through perforations therein to act upon the material throughout the length of the apparatus, so as to thoroughly extract the products in the form of vapor, which is automatically passed to the condensers.

For a full description of the invention and the merits thereof and also to acquire a knowledge of the details of construction of the means for effecting the result reference is to be had to the following description and accompanying drawings, in which—

Figure 1 is a side elevation, with parts broken away, of my improved wood-distilling apparatus, showing two of the mechanisms arranged in series, one having its receiving end coupled to the discharge end of the other. Fig. 2 is a transverse sectional view on the line X X of Fig. 1.

Corresponding and like parts are referred to in the following description and indicated in all the views of the drawings by the same reference characters.

The sawdust or other wood-pulp is fed automatically from the pit by means of preferably inclosed conveying mechanism (not shown) into the feed-hopper 1. The hopper 1 is provided at its lower end with a valve consisting of radially-extending arms 2 on a revoluble shaft 3.

4 designates a horizontally-extending casing, which is substantially of semicylindrical form, said casing being circular in cross-section below the horizontal plane at about its median line and provided with substantially horizontal walls above said plane, whereby to produce a vertically-elongated structure. The casing 4 is provided near one end with a plate or partition 5ª, separating one end of the casing from the remainder thereof and constituting a steam-chest 5, into which the steam-inlet pipe 6 opens. The hopper 1 is mounted on the casing adjacent said partition 5ª, but on the opposite side thereof from the steam-inlet pipe. A shaft 7 is journaled in suitable stuffing-boxes in the casing 4 and extends longitudinally thereof, preferably nearer the bottom than the top of the casing, and the said shaft is provided at a point within the steam-chest 5 with a steam-inlet port 8, through which steam enters the shaft. The shaft 7 is further provided with a plurality of perforations 9 throughout its length, and the shaft carries a spiral conveyer 10. The shaft 7, as before described, is journaled nearer the bottom of the casing 4 than the top, and the spiral casing is concentric to the shaft 7, and thereby affords a space or chamber 11 between it and the top of the casing, while the lowermost edges of the spiral are close to the bottom of the casing. At the end of the casing 4 opposite the steam-chest 5 said casing is provided with an upwardly-extending vapor-outlet pipe 12, through which the vapor extracted from the material is carried off to suitable condensers. (Not shown.)

As shown in Fig. 1, the casing 4 is provided with a discharge in the form of the pipe 13 underneath and in direct vertical alinement with the vapor-outlet pipe 12 at one end and adjacent the partition 5ᵇ of the subjacent casing 4ª at its other end. In the upper end of the pipe 13 is mounted a valve consisting of a plurality of radial arms 14, mounted on a revoluble shaft 15. In the present instance the discharge-pipe 13 of the casing 4 serves as a feed-pipe for the subjacent casing 4ª, and the valve of the pipe 13 corresponds in function to the valve of the hopper 1, while the steam-inlet pipe 6ª of the casing 4ª corresponds to the pipe 6. The subjacent casing 4ª corresponds in purpose and construction to the casing 4 and its concomitant parts, but is preferably reversed in position, as shown. It is provided at its end opposite the pipe 13 with a discharge-pipe 16, having a valve 17, similar to the other valves, and the pipe 16 may in turn serve as a feed-pipe for another distilling mechanism of the same general character, the said mechanisms being thus arranged in series of predetermined number coupled together, as indicated. As indicated by the dotted lines in Fig. 1, the shaft 7 may be provided at one end with any desired form of power-transmitting device, and the shaft of the adjacent casing 4ª similarly arranged, so that all the hollow and perforated shafts may be driven from the same source of power, such as the main drive-shaft 18.

In the practical operation of the improved apparatus steam is admitted into the hollow shaft 7 and out of the same into the interior of the receiver formed by the casing 4, so as to act upon the sawdust or the like admitted from the hopper 1. As the steam acts upon the material the shaft 7 is being rotated and the material is being stirred up and agitated and at the same time is being conveyed gradually from the receiving end to the discharge end of the casing. The exact construction of the valve shown in the hopper 1 will admit by a continual rotation the continuous feeding of material to the casing 4, while at the same time it will prevent any detrimental escape of steam at such point. By providing vertically-elongated casings 4 and 4ª, as shown, a longitudinally-extending chamber 11 is provided throughout the length of the casing, and such chamber, in connection with the arrangement and construction of the shafts and the spiral conveyers concentric thereto, insures that the gases may be liberated at all points from the sawdust, whence they pass automatically through the vapor-outlet pipe 12 to the condenser. As the pipe 13, arranged to feed material from one casing to the subjacent casing, is in direct vertical alinement with the vapor-pipe at one end and adjacent the subjacent casing at its other, the spiral conveyers described may be employed to effectively feed the material successively from one casing after another, so that the steaming and destructive operation upon the sawdust may be repeated as often as required to extract all of the oils from the material.

Having thus described the invention, what is claimed as new is—

The herein-described apparatus for effecting the destructive distillation of sawdust, comprising a plurality of casings each of which is of substantially semicircular form arranged horizontally, each casing being circular in cross-section below the horizontal plane at about its median line, and provided with substantially parallel walls above said horizontal plane whereby to produce a vertically-elongated structure, a perforated shaft journaled in each of said casings, said shafts being provided with a concentric spiral conveyer extending close to the lower curved wall of the casing, whereby a chamber 11 is produced above the spiral conveyer, a partition 5ª extending across each casing near one end thereof, a steam-inlet pipe entering the compartment produced by said partition, and a shaft being provided with a steam-inlet port in said compartment, a hopper mounted on one of said casings adjacent said partition, but on the opposite side thereof from the steam-inlet pipe, said hopper being provided with a valve to regulate the discharge of material into the casing, each casing being provided at its end opposite its partition with an upwardly-rising vapor-outlet pipe, and a valved pipe 13 connecting one casing with another, said pipe being located underneath and in direct vertical alinement with the vapor-outlet pipe of one casing at one end and adjacent the said partition of the adjoining casing.

In testimony whereof I affix my signature in presence of two witnesses.

ALFRED A. MacKETHAN. [L. S.]

Witnesses:
JAMES S. HALL,
JOHN A. MacKETHAN.